Nov. 2, 1965     D. MERAZ, JR     3,215,352

BI-PROPELLANT METERING AND INJECTING VALVE

Filed June 2, 1964

INVENTOR.
DANIEL MERAZ, JR.

BY

ATTORNEY.

United States Patent Office 3,215,352
Patented Nov. 2, 1965

3,215,352
BI-PROPELLANT METERING AND INJECTING VALVE
Daniel Meraz, Jr., China Lake, Calif., assignor to the United States of America as represented by the Secretary of the Navy
Filed June 2, 1964, Ser. No. 372,130
7 Claims. (Cl. 239—414)
(Granted under Title 35, U.S. Code (1952), sec. 266)

The invention described herein may be manufactured and used by or for the Government of the United States of America for governmental purposes without the payment of any royalties thereon or therefor.

This invention relates to a variable orifice area injector for metering and injecting liquid oxidant and liquid fuel into a rocket combustion chamber.

A particular problem arises when an injector, of the type referred to, is used to intermittently start and stop combustion, as for example in intermittently operated hypergolic propellant systems where the oxidant and fuel combust upon contact with one another. In prior art variable orifice area injectors and when subject to repeated starts and stops, there is a tendency for the injector orifices to become fuzed in their closed position and thus prevent restarting. This tendency particularly shows up in servo control operated combustion systems which are likely to be operated at very low flow rates close to the cut off of the valve. Under the latter conditions the servo control often brings the valve face surface and the valve seat surface together with particularly gradual movement in the presence of the intense heat of combustion, and fusing becomes likely.

Also, there is the ever present problem of providing a discharge flow stream pattern which is stable at very low flow rates and of providing a form of construction which may be easily manufactured with the tolerances needed for accurate metering at low flows rates.

An object of the present invention is to provide an improved variable orifice area injector which is not subject to becoming fused in its closed position under repeated start and stop conditions.

Another object is to provide an improved variable orifice area injector which is capable of accurately metering flow at extremely small flow rates close to the cut off condition of the valve.

Another object is to provide injector apparatus in accordance with the previous objective having a form of construction which is easy to manufacture and with desired tolerances for accurate metering at extremely low flow rates.

Other objects and many of the attendant advantages of this invention will be readily appreciated as the same becomes better understood by reference to the following detailed description when considered in connection with the accompanying drawings wherein.

Figure 1:
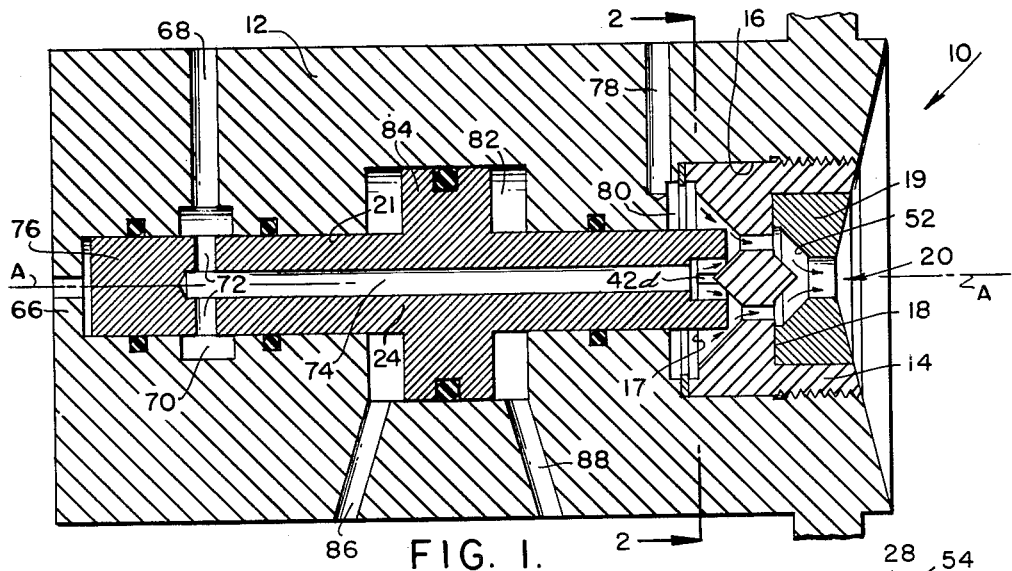
FIG. 1 is a longitudinal section of apparatus forming the subject of the invention.
Figure 2:
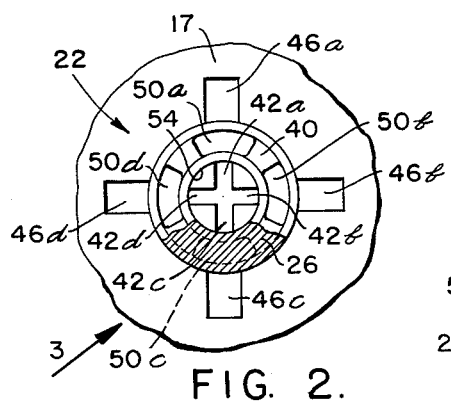
FIG. 2 is an enlarged cross-section of FIG. 1 taken along lines 2—2, FIG. 1.
Figure 3:
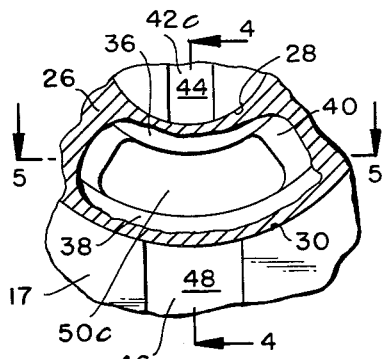
FIG. 3 is an enlarged detail indicated by arrow 3, FIG. 2.

Referring in detail to the drawing and particularly to FIG. 1, the invention comprises a metering valve and injector unit 10, which injects a predetermined ratio of liquid oxidant and fuel into a rocket motor combustion chamber at selectively variable flow rates. Unit 10, in general, includes a body made of two main parts or sections consisting of a rear body section 12, and an injector head 14. A longitudinal axis A—A is defined in section 12. The injector head 14 is threadedly secured in a concentric cavity 16 formed in the front end of section 12, and has a rear face 17 which opposes the bottom of cavity 16. At the front face of the injector head, another concentric cavity 18 forms a seat for an annular splash ring member 19. The splash ring member has an annular opening 20 and is fitted into cavity 18 with a press fit. An axially extending bore 21 is formed in rear body section 12 and opens into the bottom of cavity 16 at its front end. A concentrically aligned annular slot 22, best shown in FIG. 2, is provided in the rear face 17 of the injector head. An annular pintle member 24 is slideably disposed in bore 20 and slot 22. A front portion 26 of the pintle, having a narrowed wall thickness, slidably fits into slot 22. For a majority of its depth, the side walls of slot 22 are formed by inner and outer axially extending cylindrical surfaces 28, 30, FIGS. 3 and 4, which are adapted to slideably engage the interior and exterior cylindrical surfaces 32, 34 of the front end of the pintle. Near its bottom, the slot is formed by an inner frustoconical wall 36, an outer frustoconical wall 38, and a transverse annular bottom surface 40. Walls 36 and 38 converge and diverge, respectively, with equal angular magnitudes of convergence and divergence relative to axis A—A.

Figure 4:
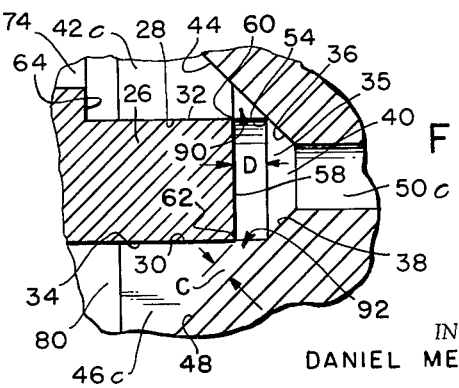
FIG. 4 is a section taken along line 4—4, FIG. 3.

As shown in FIG. 2 taken in conjunction with FIGS. 1 and 4, an inner set of four radially aligned slots 42a, 42b, 42c, 42d is formed in the portion of injector head 14 surrounded by annular slot 22. Each slot of the set opens into both the inner cylindrical wall 28 of annular slot 22 and the rear face 17 of injector head 14. These slots, which may be formed by milling, each have an oblique bottom wall 44, FIGS. 3 and 4, which intersects the inner surface 28 of annular slot 24 at the junction of the latter with inner frustoconical wall 36, and is inclined at the same angle of convergence as frustoconical side wall 36, so that the frustoconical wall 36 and oblique bottom wall 44 essentially merge at the forward end of the slot and define an angle of divergency of the outwardly facing frusto conical wall with respect to the convergency of the inwardly facing frusto conical wall of between a lower limit of thirty degrees and an upper limit of sixty degrees. An outer set of four radially aligned slots 46a, 46b, 46c, 46d is formed in the portion of body section 12 surrounding slot 24. Each of these slots open into both the outer cylindrical wall 30 of the annular slot and end face 17 of the injector head, and have an oblique bottom wall 48 inclined at the angle of convergence of outer frustoconical wall 38. The individual slots of inner and outer sets 42 and 46 are radially aligned with one another and is equi-angular radially spaced, or quadrature, relationship about axis A—A, so that the slots 42a and 46a, 42b and 46b, etc. form opposed pairs of longitudinally extending openings in the lateral walls of slot 22. The thickness of the slots of inner set 42 of slots is smaller than the thickness of the slots of outer set 46, in accordance with a predetermined ratio of such thicknesses. The purpose of this difference of thickness will become apparent in connection with the description of the operation, to follow. Four longitudinal passages 50a, 50b, 50c and 50d, having arcuate cross sections, are angularly aligned with the opposed pairs of slots. Passages 50 extend from the bottom of annular slot 20 to front end of the injector head, opening into the latter at positions contiguous to central opening 20 of the splash ring 19 forms a frustoconical splash surface 52 in spaced and confronting relationship to the openings of passages 50. Surface 52 is of conventional forwardly convergent construction designed to atomize and mix flow of liquid which impinges thereagainst and direct same out through the front end of central opening 20 in a generally forwardly directed spray stream.

Figure 6:
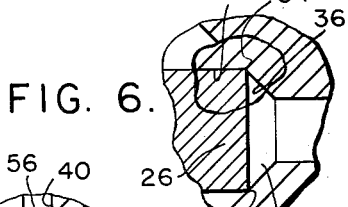
FIG. 6 is a section like FIG. 4, but showing the parts in a different relative position, and partially cut away.
Figure 5:
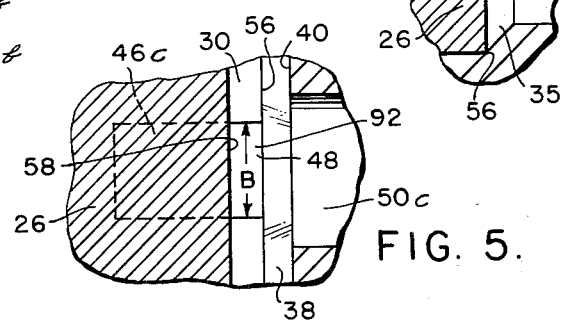
FIG. 5 is a section taken along line 5—5, FIG. 3.

Reference is now made to FIGS. 4, 5 and 6, showing details of the annular slot 22 and the front end portion 26 of the pintle, the latter FIG. 6 showing the disposition of the parts in the "closed" or "cut-off" position of unit 10. As best shown in the cutaway in FIG. 6, the cylindrical and frustoconical portions 28 and 36 of the outer wall of slot 22 intersect forming a circular obtuse internal corner 54 along the inner wall of the slot. In similar manner walls 30 and 38 form an internal corner 56 along the outer wall of the slot. The front end of pintle 24 is a transverse annular surface 58. The inner periphery of surface 58 forms a circular right angle exterior corner 60, FIG. 4, and the outer periphery surface 58 forms a right angle exterior circular corner 62. A shoulder 64 is provided on the interior surface of the pintle 24 to provide additional volume. The forward displacement limit of the pintle is the position in which right angle exterior corners 60 and 62 engage internal corners 54 and 56, respectively, as shown in FIG. 6. Pintle displacement is limited in the rearward direction to a limit position determined by abutment of the rear end of the pintle against the wall 66 which closes the rear end of bore 21. The total stroke, or range of displacement of the pintle between its forward and rear limit position is no more than one-half of the width of the slots of the thinner set 42, for reasons which will become apparent in the description of the operation.

An oxidizer passage 68 near the rear end of the body section 12 forms an input port for connection to a supply line, not shown, from a source of pressurized liquid oxidant, and communicates same to an annular chamber 70 about bore 21. A plurality of angular spaced perforations 72, through the tubular wall of pintle 24, are disposed at a zone of the pintle adjacent chamber 70 and communicate the oxidizer to the central opening 74 of the pintle. Central opening 74 serves as an axial passage which communicates the oxidant to the inner set of radial slots 42, the rear end of central opening being closed by an integrally formed wall 76. A fuel passage 78 near the front end of body section 12 forms an input port for connection to a supply line, not shown, from a source of pressurized liquid fuel, and communicates same to an annular chamber 80 formed between body section 12 and the rear face 17 of injector head 14. Chamber 80 serves to communicate the oxidant to the outer set of slots 46.

A piston for controlling the position of pintle 24 is provided in body section 12. A piston chamber 82 is formed in body section 12 as an enlarged portion of bore 21 midway between its ends. An integrally formed piston element 84 is provided on pintle 24 with the outer periphery of the piston element adapted to slidingly engage the outer wall of chamber 82. First and second hydraulic control passages 86 and 88 from a hydraulic control input and lead into chamber 82 at one end the other of its ends. In accordance with conventional hydraulic control techniques, the axial position of pintle 24 is accurately controlled by applying differentials of hydraulic pressure across the opposite faces of piston element 84.

In describing the operation of unit 10, it is first assumed that the pintle 24 is in the position shown in FIGS. 4 and 5, with its front face 58 displaced from its forward limit position by a distance D, FIG. 4. As previously noted, the individual slots of sets 42 and 46 open into annular slot 22 as opposed pairs disposed in quadrature relationship about the axis A—A. Since the forward limit of displacement of the pintle coincides with the front edges of these opposed pairs of slots, they are all uncovered at their front ends for an axial distance equal to the distance D. As the result, a rectangular oxidant, orifice 90, FIG. 4, which opens into the annular slot 24 is formed at the front end of each slot of set 42, the orifice being formed by the lateral walls of the slot, the oblique bottom wall 44 of the slot and the inner peripheral corner 60 of the pintle. A fuel orifice 92 is formed at the front end of each slot of set 46, by corresponding lateral and bottom slot walls and outer peripheral corner 62. As best seen in FIG. 5 in connection with fuel orifice 92, orifices 90 and 92, each have an elongated rectangular cross section with a length B, equal to the thickness dimension of the slot, which it opens into; and a width C, FIG. 4, equal to the normal, or pendicular, distance from the oblique bottom 48 to the peripheral corner of the pintle. As previously noted, slot bottoms 48 and frustoconical surfaces 38, and slot bottoms 44 and frustoconical surface 36 are inclined at the same angles and form essentially merged surfaces adjacent the orifices 90 and 92, which serve to guide the flow of oxidant and fuel from such orifices. The guide surfaces direct these streams at the angles of convergence and divergence of the frustoconical walls causing the stream from each opposed pair of slot openings to impinge upon one another at the front ends of each of longitudinal passages 50. The general nature of this flow pattern is indicated by arrows in FIG. 1. Impingement of the opposed streams of oxidant and fuel at the front end of passages 50 cause their mixing and atomizing, and the resultant mixed and atomized oxidant and fuel flows forwardly through the passages. After emerging from the front end of the passages, these streams impinge against frustoconical splash surface 52. The splash surface is designed to deflect the flow radially inwardly and forwardly through the front end of central opening 20 as a spray of atomized and mixed liquid oxidant and fuel, which upon emerging from the front end of central opening 20 changes to a gaseous state. Further movement of pintle 24 away from its forward limit position increases the width of the orifices 90 and 92 in direct proportion to the increase in pintle displacement D. Since the length of the orifices is constant and since the cross sectional area of the rectangular orifices is proportional to the product of their width and length, the resultant increase in flow rate from one and the other of the opposed slots will be at a constant ratio of oxidant to fuel flow. It will be apparent that the heretofore described predetermined ratio of the thickness dimension of the slots of inner set 42 and the thickness dimension of the slots of outer set 46 determine this flow ratio. In similar manner movement of the pintle toward its forward limit position decreases the flow rates of oxidant and fuel at a constant ratio. An important feature of the invention is that the ribbon like flows produced by the orifice construction are very stable at extremely small flow rates. Movement of the pintle to its forward limit position shuts off the injector, the engagement of the inner and outer peripheral corners 60 and 62 of the pintle in the internal corners 54 and 56 serving as the seal against leakage.

Obviously many modifications and variations of the present invention are possible in the light of the above teachings. It is therefore to be understood that within the scope of the appended claims the invention may be practiced otherwise than as specifically described.

What is claimed is:

1. In a variable orifice area metering valve and injector apparatus for metering and injecting first and second liquid propellants consisting of a liquid oxidant and a liquid fuel into a combustion chamber, said apparatus being operative to inject selectively variable flow rates of both the oxidant and fuel into the combustion chamber at a predetermined ratio of oxidant flow to fuel flow over its range of metered flow rates, the combination comprising;

(a) a body member having opposite ends consisting of a front end to be disposed toward the combustion chamber and a rear end forming a rear face, (b) an annular slot formed in said rear face about a reference axis of concentricity transverse to said face, said slot having a first rear axial section adjacent said rear face formed by a radially outwardly facing cylindrical wall of uniform diameter and a radially inwardly facing cylindrical wall of uniform diameter, and a second axial section adjacent the front end of said first section formed by a radially outwardly facing forwardly divergent frustoconical wall, and a radially inwardly facing forwardly convergent frustoconical wall, said outwardly and inwardly facing frustoconical walls having a common value of angular magnitudes of divergency and convergency, (c) a tubular metering pintle supported for axial rectilinear movement and having its front end slidingly disposed in said slot, (d) first liquid propellant supply means communicating one of said propellants to said inner zone of the rear face of the body member, and second liquid propellant supply means communicating the other propellant to the outer zone of the rear face, (e) an inner set of angularly spaced radial slots formed in the portion of the body member surrounded by the annular slot, each slot of said set opening into both the inner zone of said rear face and the said outwardly facing cylindrical wall of said annular slot and having an oblique bottom wall which is inclined at the same angle of divergency and merges with the outwardly facing frusto-conical wall, and an outer set of angularly spaced radial slots formed in the portion of the body member surrounding the annular slot, each slot of said outer set opening into both the outer zone of said rear face and said inwardly facing cylindrical wall and having an oblique bottom wall which is inclined the same angle of convergency as and merges with said inwardly facing frustoconical wall, the individual slots of said inner set and the individual slots of said outer set being radially aligned with one another, whereby the openings of the individual slots of the inner slots into said outwardly facing cylindrical wall and openings of the individual slots of the outer slots into said inwardly facing cylindrical wall form angularly spaced radially aligned opposed pairs of openings into the annular slot, and (f) axially extending outlet conduit means communicating the bottom of said annular slot and the front end of said body member, whereby movement of the pintle away from a forward position defined by the junction of the cylindrical walls and the frustoconical walls by a distance of displacement which is smal relative to the thickness of the individual radial slots simultaneously uncovers the front ends of the angularly opposed pairs of openings, said uncovered front ends of the openings forming rectangular orifices having substantially greater length than width, whereby oxidant and fuel issue from one and the other of each opening of the opposed pairs as ribbon-like streams which are guided by the merged slot bottom and frustoconical surfaces into impingement with one another and flow through the outlet opening as angularly spaced streams of mixed and atomized liquid oxidant and liquid fuel.

2. Apparatus in accordance with claim 1,
(g) said outlet conduit means cooperating with a frustoconical splash surface disposed in confronting relation to the outlet end of said conduit means to further atomize and mix the streams of atomized oxidant and fuel and direct the oxidant and fuel into the combustion chamber in a desired spray pattern.

3. Apparatus in accordance with claim 2,
(h) said splash surface being formed by an annular member having a central opening, said frustoconical surface being radially inwardly convergent in the forward direction and constructed and arranged to direct said spray pattern through the central opening.

4. Apparatus in accordance with claim 1, wherein
(i) said common value of angular magnitude of the divergency of the outwardly facing frustoconical wall and of the convergency of the inwardly facing frustoconical wall is a value between a lower limit of thirty degrees and an upper limit of sixty degrees.

5. Apparatus in accordance with claim 1,
(j) said pintle having a flat front end forming inner and outer circular right angle exterior corners at its inner and outer periphery, said corners engaging the inner and outer circular obtuse internal corners formed at the junction of the cylindrical walls and the frustoconical walls of the slot in the forward limit position of the pintle, which is the closed position of the valve and injector apparatus.

6. Apparatus in accordance with claim 1,
(k) the thickness of the slots of the inner set of slots and the thickness of slots of the outer set of slots being so chosen to fix the desired ratio of oxidant flow to fuel flow.

7. Apparatus in accordance with claim 1,
(l) said inner and outer sets of slots each comprising four slots, the individual slots of the sets being aligned with transverse radial reference planes through the axis of concentricity, and
(m) set conduit means comprising four longitudinally extending channels adjacent the front end of the second axial section of the annular slot, said channels being individually angularly aligned with the opposed pairs of openings, said channels each having an arcuate cross section having a radial thickness equal to the radial thickness of the front end of said second axial section of the annular slot.

References Cited by the Examiner

UNITED STATES PATENTS

| | | | |
|---|---|---|---|
| 2,779,158 | 1/57 | Dungan | 60—35.6 |
| 2,870,603 | 1/59 | Long | 60—35.6 |
| 2,979,891 | 4/61 | Widell | 60—35.6 |
| 3,093,157 | 6/63 | Aitken et al. | 137—605 |
| 3,098,353 | 7/63 | Abild | 60—35.6 |

EVERETT W. KIRBY, *Primary Examiner.*